(12) United States Patent
Albright et al.

(10) Patent No.: US 12,508,112 B2
(45) Date of Patent: Dec. 30, 2025

(54) AUTOMATIC PAUSE CONTROL RESET MECHANISM

(71) Applicant: KONINKLIJKE PHILIPS N.V., Eindhoven (NL)

(72) Inventors: Ethan Albright, Mill Creek, WA (US); Yan Gao, Bothell, WA (US); Ryan Richard Johnson, Bothell, WA (US); Jeffrey Groves, Seattle, WA (US)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 1017 days.

(21) Appl. No.: 17/604,399

(22) PCT Filed: Apr. 16, 2020

(86) PCT No.: PCT/EP2020/060653
§ 371 (c)(1),
(2) Date: Oct. 16, 2021

(87) PCT Pub. No.: WO2020/212465
PCT Pub. Date: Oct. 22, 2020

(65) Prior Publication Data
US 2022/0211474 A1 Jul. 7, 2022

Related U.S. Application Data

(60) Provisional application No. 62/835,609, filed on Apr. 18, 2019.

(51) Int. Cl.
*A61C 17/024* (2006.01)
*A61C 17/02* (2006.01)
*A61H 13/00* (2006.01)

(52) U.S. Cl.
CPC ........ *A61C 17/024* (2019.05); *A61C 17/0202* (2013.01); *A61H 13/005* (2013.01)

(58) Field of Classification Search
CPC .. A61H 13/00–005; A61C 15/047–048; A61C 17/02–0202; A61C 17/0211;
(Continued)

(56) References Cited

U.S. PATENT DOCUMENTS 5,697,784 A * 12/1997 Hafele .................. A61C 17/02
433/80
6,382,970 B1 5/2002 Foster
(Continued)

FOREIGN PATENT DOCUMENTS

DE 3101941 A1 8/1982
DE 3225918 A1 1/1984
(Continued)

OTHER PUBLICATIONS

Translation of WO 2019/182169. Accessed from PE2E-Search on Jul. 8, 2025. (Year: 2019).*
(Continued)

*Primary Examiner* — Paige Kathleen Bugg

(57) ABSTRACT

This disclosure is directed to systems and methods for automatically resetting pause control on an oral irrigator. The methods use a resilient device which stores potential energy when the oral irrigator is turned on or the pause control feature is turned off. The stored potential energy is then released and switches the pause control feature on when the oral irrigator is turned off or placed on its stand. The pause control assembly includes a slider coupled to the valve, where the slider has a first protrusion; a return which makes contact with a first protrusion of the slider; and a stopper, which in the closed position prevents the return from moving. The automatic pause control reset can also include a pressure plate and a pressure chamber which respond to a change in fluid pressure to permit the opening of a pause control valve.

12 Claims, 20 Drawing Sheets

(58) Field of Classification Search
CPC ..... A61C 17/024; A61C 17/028; A61C 17/28; A61C 17/36; A61C 17/38
USPC .................................................. 601/162–164
See application file for complete search history.

(56) References Cited

U.S. PATENT DOCUMENTS

| | | |
|---|---|---|
| 2015/0147717 A1 | 5/2015 | Taylor et al. |
| 2018/0168785 A1 | 6/2018 | Wagner et al. |
| 2018/0263742 A1* | 9/2018 | Taylor ................... A61M 3/005 |

FOREIGN PATENT DOCUMENTS

| | | | | |
|---|---|---|---|---|
| DE | 3231537 A1 | 3/1984 | | |
| JP | 2006158938 A | 6/2006 | | |
| WO | WO-2019182169 A1 * | 9/2019 | ............. | A61C 17/20 |

OTHER PUBLICATIONS

International Search Report and Written Opinion Dated Jun. 26, 2020 For International Application No. PCT/EP2020/060653, Filed Apr. 16, 2020.

* cited by examiner

AUTOMATIC PAUSE CONTROL RESET MECHANISM

FIELD OF THE DISCLOSURE

The present disclosure is directed generally to automatic pause control reset mechanisms, particularly for use in oral irrigators.

BACKGROUND

Some personal care appliances, such as oral irrigators, contain pause control mechanisms which allow a user to stop use of the personal care appliance temporarily while the personal care appliance is powered on. Frequently the control allows the user to stop and start the appliance using a button, slider, or some other control mechanism intended for operation by the same hand holding the personal care appliance or its handle.

SUMMARY OF THE DISCLOSURE

The present disclosure is directed to mechanisms to automatically reset the pause control valve in a pause control mechanism located on the handle of a personal care appliance, such as an oral irrigator. When the appliance is turned off or returned to its handle, the pause control is reset to the paused state, which prevents the appliance from operating until the user turns off pause control when the user is ready to use the appliance and is holding its handle.

Generally, in one aspect, a method of resetting a pause control mechanism of an oral irrigator is provided. The method comprises: providing the oral irrigator, the oral irrigator comprising a handle having a bi-stable pause control element; placing the oral irrigator to an on state to permit fluid flow through a fluid channel of the handle of the oral irrigator; operating a valve, via the bi-stable pause control element, to permit fluid flow through a valve of the handle of the oral irrigator; compressing a resilient device from a first position to a second position; locking, via a locking mechanism, the resilient device in the second position; releasing the locking mechanism by placing the handle of the oral irrigator in a stand or by turning the oral irrigator to an off state.

In an aspect, the method further comprises the step of expanding the resilient device from the second position to the first position and setting the pause control element to inhibit fluid flow after releasing the locking mechanism.

Generally, in one aspect, an oral irrigator system comprising an oral irrigator comprising an oral irrigator handle comprising a housing, the housing having a cavity arranged therein, is provided. The cavity comprises a pause control assembly, comprising: a valve; a slider coupled to the valve, wherein the slider is configured to move between a first position and a second position, the slider further comprising a first protrusion; a return; and a stopper. The return comprises: a first portion extending in a first direction, the first portion having a first end and a second end, wherein the first end is in contact with the first protrusion of the slider; and a second portion extending in the second direction orthogonal to the first direction, the second portion having a third end and a fourth end, wherein the second portion further comprises a through bore arranged to receive a valve body; wherein the second end of the first portion and the third end of the second portion are connected with each other. The stopper has an open position and a closed position, wherein the stopper is arranged to prevent motion of the return in a third direction opposite the first direction.

In an aspect, the system is further configured such that the pause control assembly is configured such that the first position of the slider corresponds to a closed state of the valve and the second position of the slider corresponds to an open state of the valve, wherein when the slider is moved from the first position to the second position, the return is moved from a first position to a second position, and when the return is moved to the second position, the stopper is arranged to engage and secure the fourth end of the return.

In an aspect, the system is further configured such that the pause control assembly further comprises a resilient device arranged to bias the return in a third direction opposite the first direction.

In an aspect, the system is further configured such that the pause control assembly further comprises a hinge, wherein the hinge is configured to allow the stopper to rotate in a first rotational direction and a second rotational direction opposite the first rotational direction. The hinge comprises a first hinge component arranged on the valve body and a second hinge component arranged on the stopper.

In an aspect, the system is further configured such that the stopper further comprises a first portion extending in the first direction from the second hinge component and a second portion extending in the third direction from the second hinge component.

In an aspect, the system further comprises a valve body having a second biasing element arranged to bias the first portion of the stopper in the second direction. When the return is in the second position, the stopper is arranged to rotate in the first rotational direction about the hinge and engage and secure the fourth end of the return in a locked state. The first portion of the stopper further comprises a catch protruding in the first direction and a ledge protruding in the second direction, wherein the ledge is arranged to apply a force in the first direction and the catch is arranged to apply a force in the second direction when the stopper is in the second position when the return is in a locked state.

In an aspect, the system further comprises a stand arranged to receive the oral irrigator handle and arranged to engage with the stopper.

In an aspect, the stand comprises a magnet arranged to bias the second portion of the stopper or the stand comprises a mechanical protrusion arranged to engage with the second portion of the stopper.

Generally, in one aspect, an oral irrigator system having an oral irrigator with a handle, the handle comprising a housing, the housing having a cavity arranged therein, is provided. The cavity comprises: a fluid channel wherein a fluid flow moves in a first direction substantially parallel with a first axis when the oral irrigator is in an on state; a valve arranged to inhibit and allow the fluid flow through the fluid channel when in a closed state and an open state, respectively; a pressure plate arranged to move in a second direction orthogonal to the first direction, or a third direction opposite the second direction, when pressure increases in the fluid channel due to the fluid flow; a resilient device arranged to compress in the second direction or the third direction; and a gated path component. The gated path component has a body, the body comprising: a first channel arranged within the body and extending in the second direction or the third direction, the first channel having a first end and a second end; a second channel arranged within the body extending in the first direction, and at a first angle with respect to the first axis, the second channel having a third end and a fourth end; wherein the second end of the first channel and the third end of the second channel are integrally connected with each other.

In an aspect, the system is further configured such that the handle further comprises: a slider arranged to move from a first position to a second position, wherein the first position and the second position correspond to the closed state and open state of the valve, respectively; a guide pin arranged within the cavity of the oral irrigator handle, the guide pin arranged to move within the first channel and second channel of the gated path component; a tab fixedly secured to the slider, the tab comprising a third channel extending in the second direction or the third direction and arranged to slidingly engage the guide pin; wherein the fluid flow within the fluid channel creates a first force on the pressure plate in the second direction or the third direction transitioning the oral irrigator into an unlocked state.

In an aspect, the system is further configured such that in the unlocked state the slider is arranged to move from the first position to the second position, and the slider is arranged to move the guide pin along the second channel of the gated path component, wherein the transition of the slider from the first position to the second position corresponds to a transition of the valve from the closed state to the open state.

In an aspect, the system is further configured such that when the oral irrigator is in the off state, the slider is arranged to move from the second position to the first position, and the slider is arranged to move the guide pin along the second channel of the gated path component, wherein the transition of the slider from the second position to the first position corresponds to a transition of the valve from the open state to the closed state.

In an aspect, the system is further configured such that in the off state, the guide pin is further arranged to move within the first channel of the gated path component from the second end to the first end, transitioning into a locked state.

These and other aspects of the various embodiments will be apparent from and elucidated with reference to the embodiment(s) described hereinafter.

BRIEF DESCRIPTION OF THE DRAWINGS

In the drawings, like reference characters generally refer to the same parts throughout the different views. Also, the drawings are not necessarily to scale, emphasis instead generally being placed upon illustrating the principles of the various embodiments.

DETAILED DESCRIPTION OF EMBODIMENTS

The present disclosure is directed to mechanisms to automatically reset an oral irrigator to a paused state when the oral irrigator is turned off or returned to its handle. When the oral irrigator is in the paused state, a pause control button or other user contact located on the oral irrigator handle is used to resume fluid flow through the oral irrigator nozzle. If the oral irrigator was not placed in the paused state when the oral irrigator was previously turned off, for example if the oral irrigator needed more water to be added to its reservoir, then fluid may flow unexpectedly from the nozzle when the oral irrigator is turned on or removed from the handle, possibly spraying water onto walls, mirrors, floors, etc. By automatically resetting the oral irrigator to the paused state, when the user wants to resume use of the oral irrigator, and powers the appliance on or removes the appliance from its handle, the user will have more control over the operation of the appliance. For example, the user can release pause control while holding the oral irrigator handle in proximity to the mouth.

This disclosure is directed to systems and methods for automatically resetting pause control on an oral irrigator. The methods use a resilient device which stores potential energy when the oral irrigator is turned on or the pause control feature is turned off. The stored potential energy is then released and switches the pause control feature on when the oral irrigator is turned off or placed on its stand. The systems for automatically resetting pause control have a pause control assembly which can include: a slider coupled to a valve, where the slider has a first protrusion; a return which makes contact with a first protrusion of the slider; and a stopper, which in the closed position prevents the return from moving. The systems for automatically resetting pause control can also include a pressure plate and a pressure chamber which respond to a change in fluid pressure to permit the opening of a pause control valve.

Figure 1:
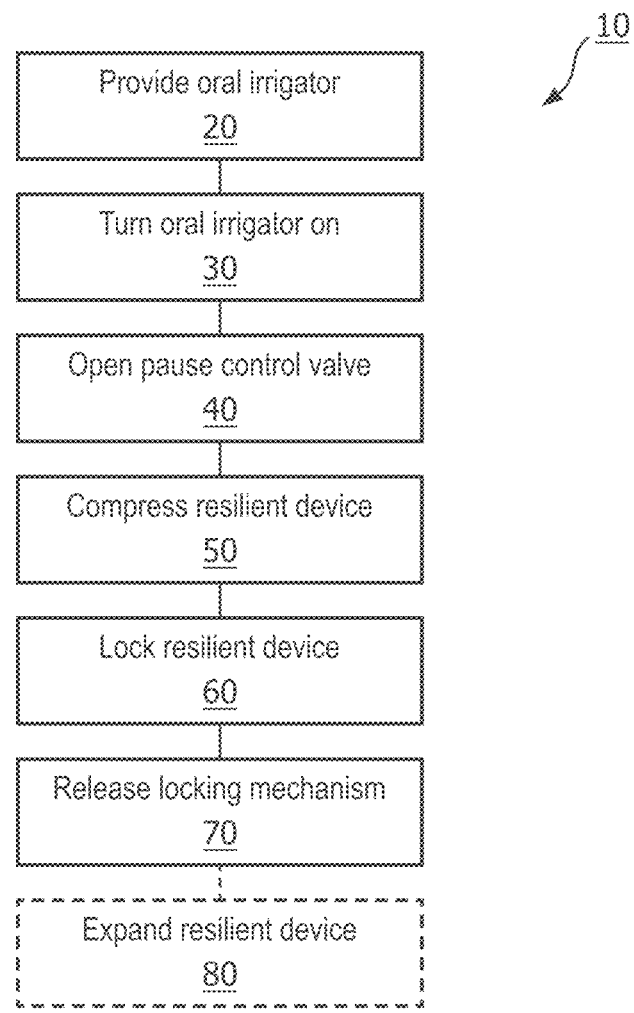
FIG. 1 is a flowchart showing steps for implementing an automatic pause control reset mechanism according to aspects of the present disclosure.
Figure 2:
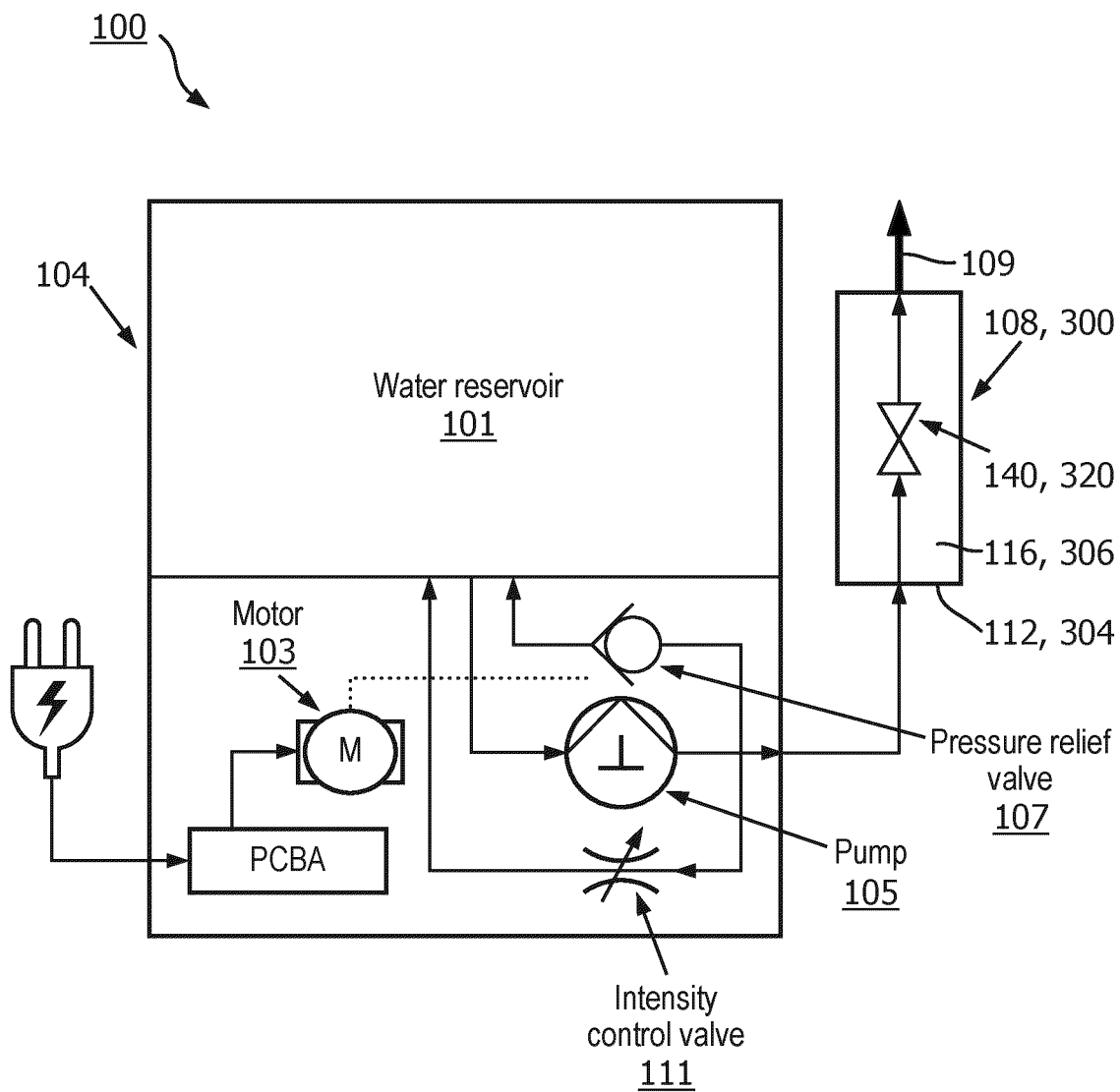
FIG. 2 is an illustration of an oral irrigator system according to aspects of the present disclosure.

FIG. 1 is a flow chart illustrating an exemplary method 10 of resetting a pause control mechanism of an oral irrigator 104. At step 20 an oral irrigator 104 is provided (such as shown in FIG. 2) having a bi-stable pause control element. A bi-stable pause control element is a pause control which can remain in either the on or the off state indefinitely without continuous user input. For example, a non-bi-stable pause control would require the user to hold down the pause control to maintain the system in a paused state, such that when the user releases the control normal operation is resumed. Bi-stable pause control elements can include any mechanism to prevent or permit fluid flow through a fluid channel, including using a valve and sliders or user contacts, which permit fluid flow to remain inhibited or flowing until user input is provided, changing the state of the pause control element. This includes the mechanisms to inhibit and permit fluid flow through the valve to the oral irrigator nozzle illustrated in FIGS. 2-20. At step 30, the oral irrigator 104 is turned on. The oral irrigator contains a means for creating pressurized flow, for example, using a pump and a motor. The oral irrigator pump provides fluid flow through the fluid channel of the oral irrigator handle, for example, as shown in FIGS. 2-20. At step 40, the pause control mechanism is turned off, meaning that the pause control mechanism does not inhibit fluid flow. For example, the pause control valve is opened to permit fluid flow to the nozzle, through the fluid channel of the oral irrigator handle and through the valve, as shown in FIGS. 2-20.

Figure 18:
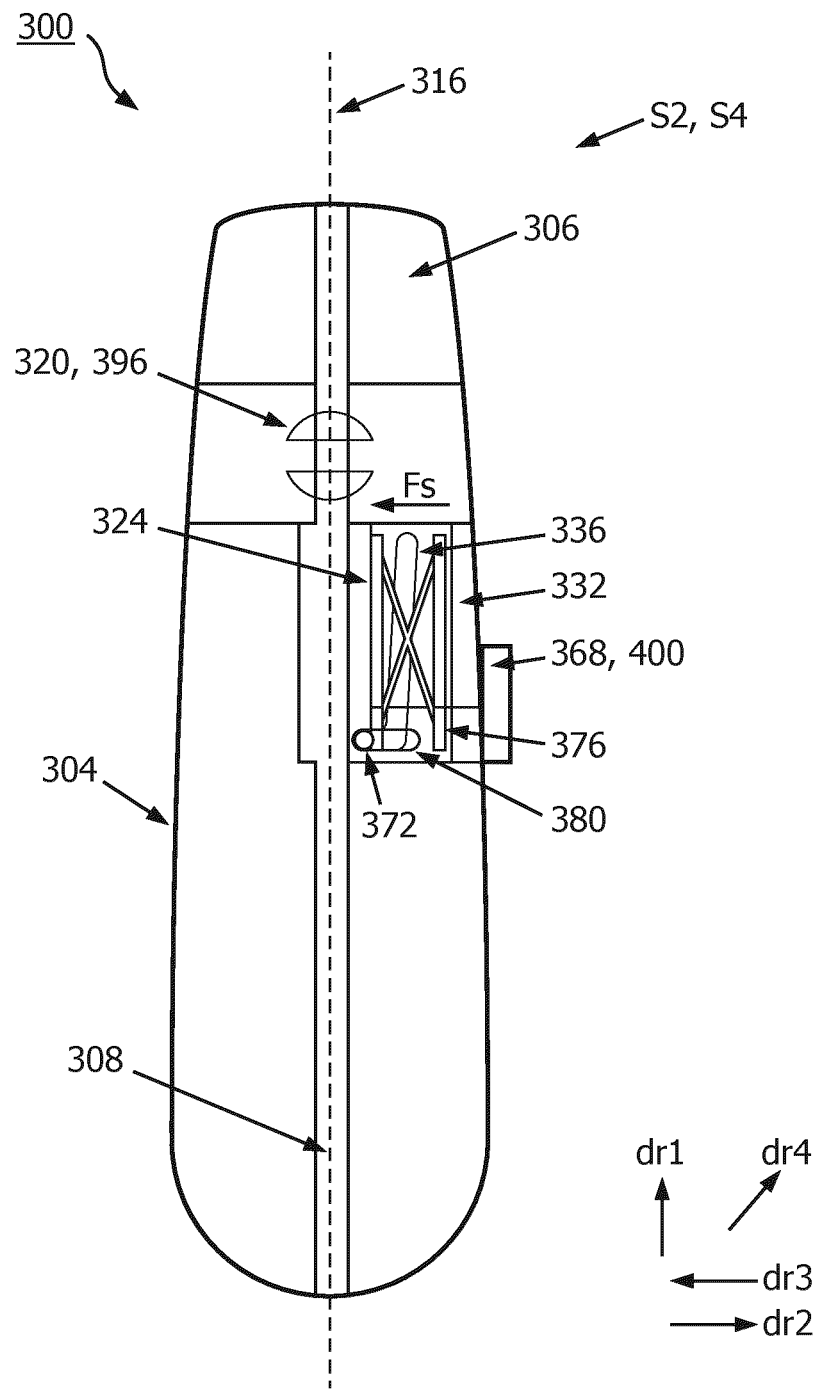
FIG. 18, FIG. 19, and FIG. 20 are schematic representations of fluid pressure resettable pause control mechanisms.
Figure 19:
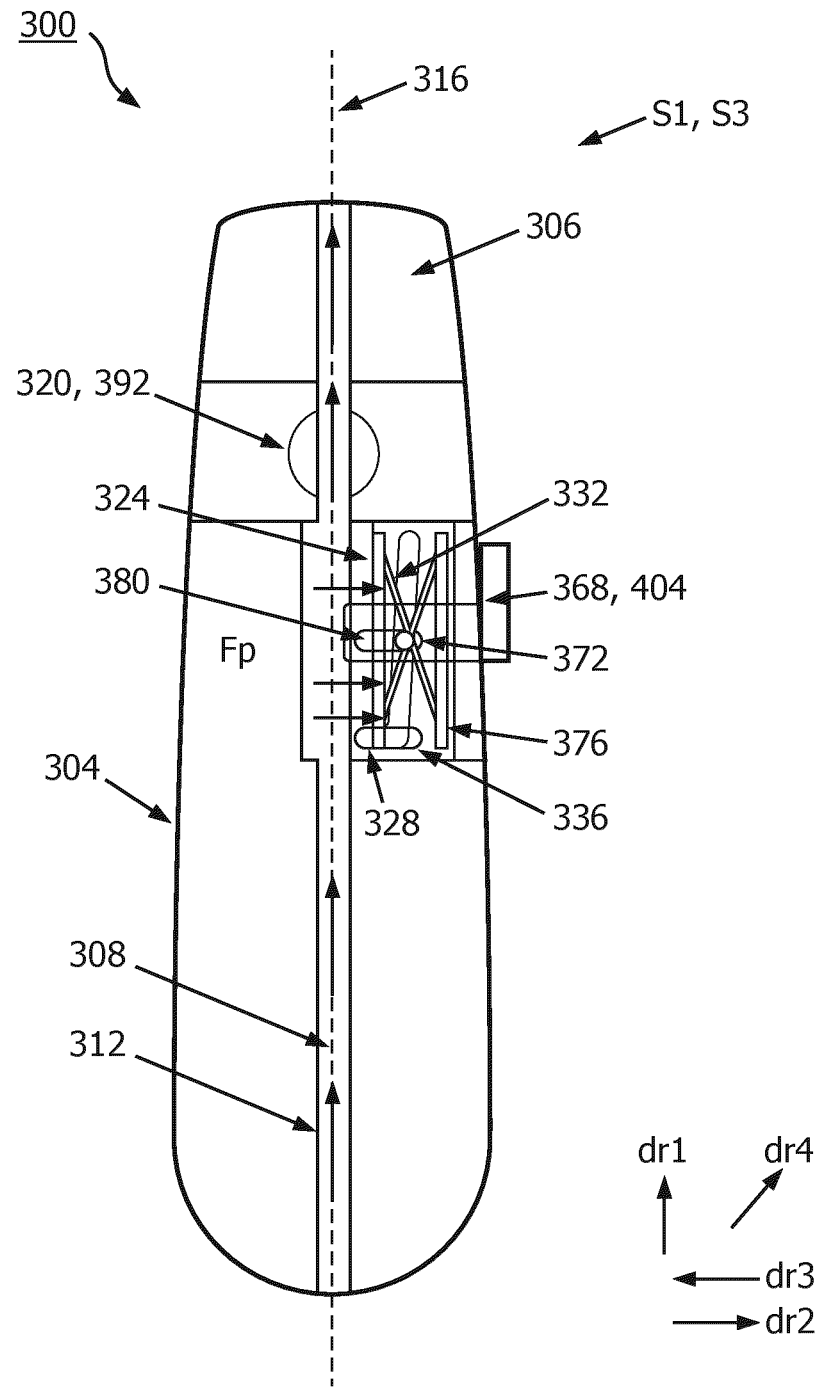
Figure 20:
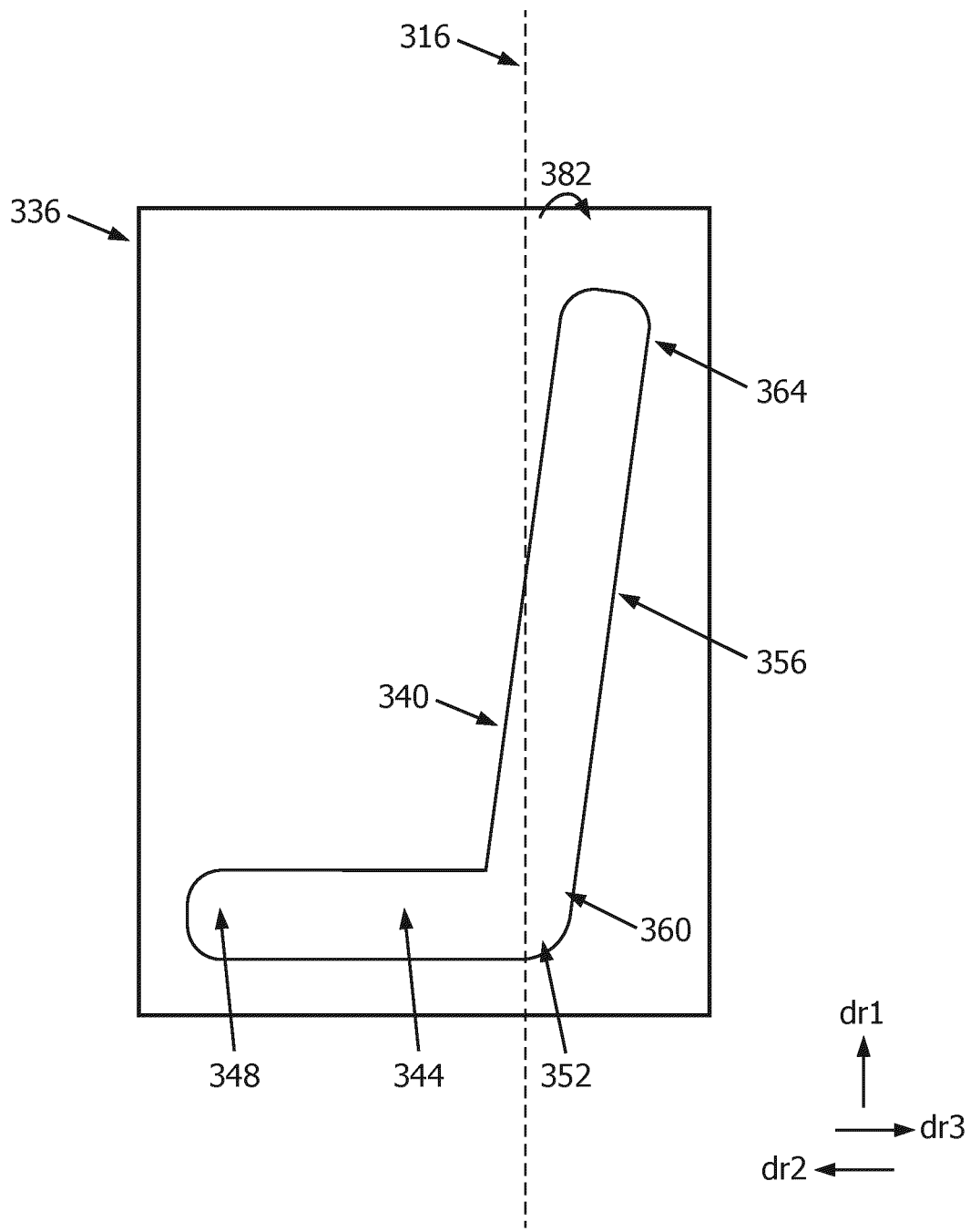

At step 50, a resilient device, which is part of the oral irrigator system, that can store potential energy is compressed. For example, the resilient device can be compressed due to fluid pressure in the fluid channel of the oral irrigator as shown in FIGS. 18-20. The resilient device can also be compressed due to the movement of other parts of a pause control assembly, for example due to a mechanical force of a moving part, such a return, as shown in FIGS. 3-9. At step 60, the resilient device is locked into its compressed position. For example, this locking may involve applying a force using a mechanical device in the direction of the compression of the resilient device. This force may be applied by a stopper as shown in FIGS. 3-11 or fluid pressure build up during the operation of the oral irrigator as shown in FIGS. 18-20. At step 70, the oral irrigator is turned off, for example by stopping power to the motor of the oral irrigator, or the oral irrigator is placed on its stand, and the locking mechanism is released. At optional step 80, after the locking mechanism, which was keeping the resilient device in a compressed state, is released, the stored potential energy of the resilient device is used to switch the pause control element, such as a slider and/or valve, to the on state (meaning that the pause control element inhibits fluid flow) to prevent future fluid flow through the valve to the oral irrigator nozzle.

Figure 3:
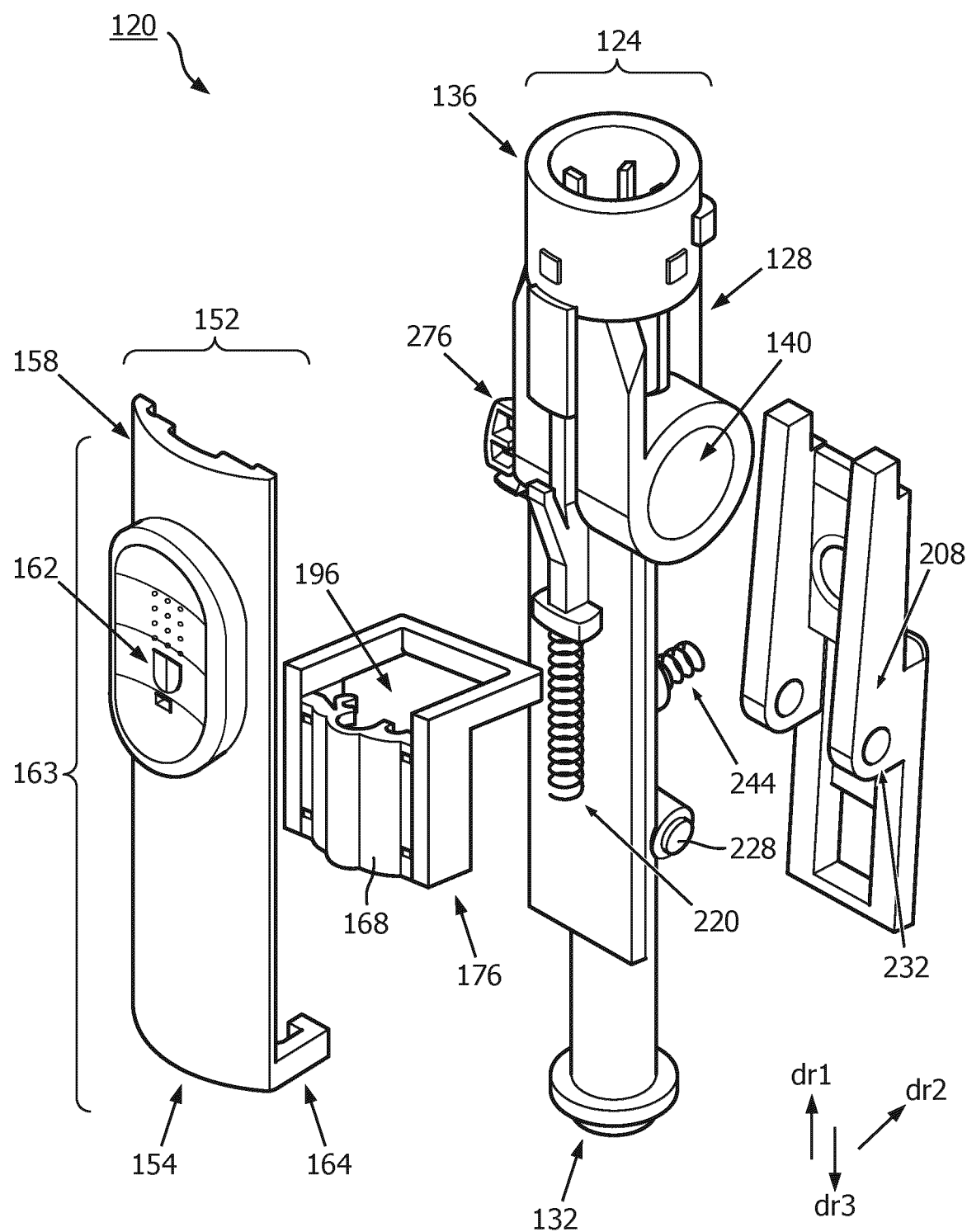
FIG. 3 is an expanded view of a pause control assembly according to aspects of the present disclosure.
Figure 4:
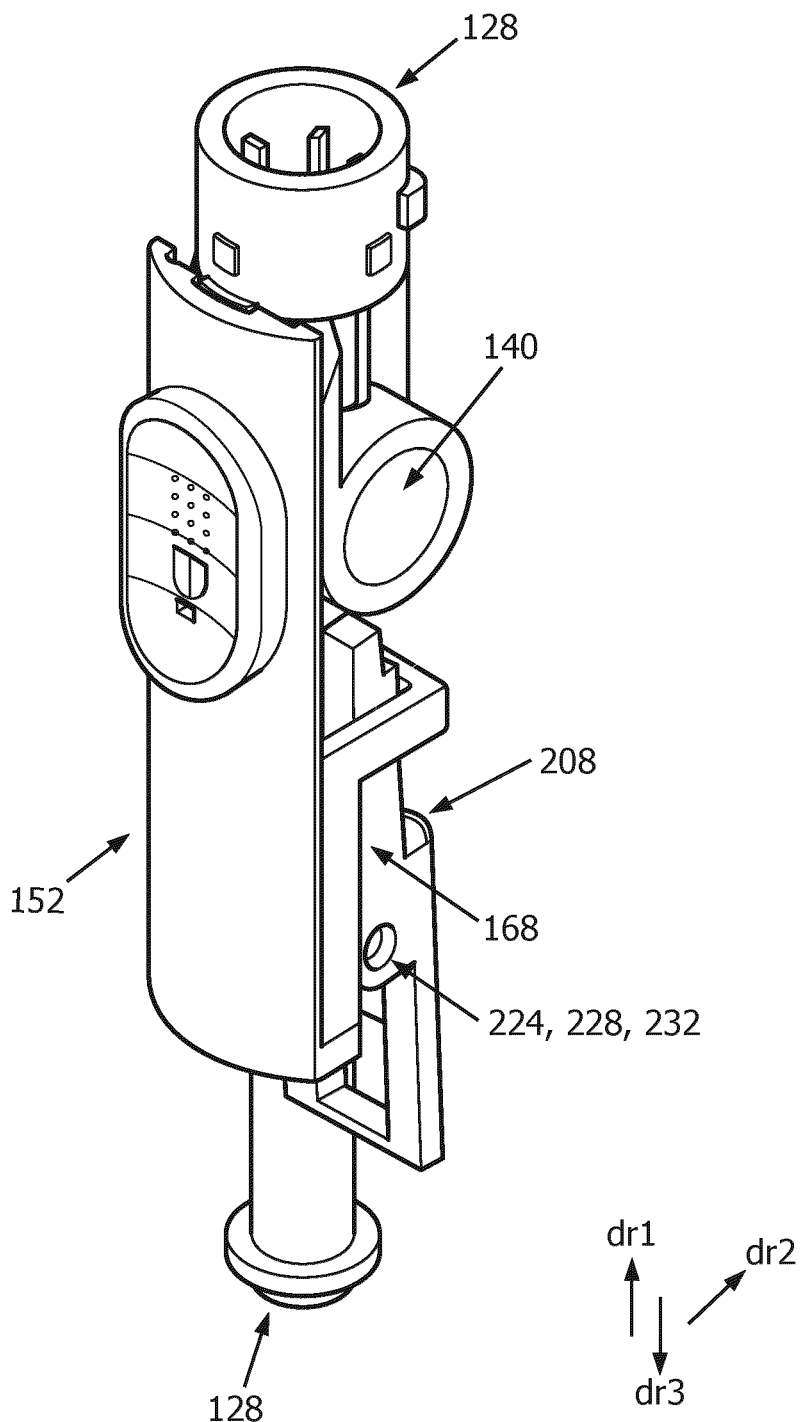
FIG. 4 is a collapsed view of a pause control assembly according to aspects of the present disclosure.

Referring to the figures, FIG. 2 is an illustration of oral irrigator system 100. The system includes an oral irrigator 104. The oral irrigator 104 can include a water reservoir 101, a motor 103, pump 105, a pressure relief valve 107, mechanical intensity control valve 111, valve 140, and a nozzle 109. The water reservoir 101 contains fluid which the oral irrigator releases through nozzle 109. The motor 103 and pump 105 create pressurized flow from the water reservoir 101 to the oral irrigator handle 108 and nozzle 109. As shown in FIG. 2, the oral irrigator has a handle 108, 300 which has a housing 112, 304 encasing a cavity 116, 306 in which a pause control assembly 120 is contained. FIG. 3 is an illustration of pause control assembly 120, in an exploded view. FIG. 4 is a compressed view of the components of the pause control assembly 120.

Figure 5:
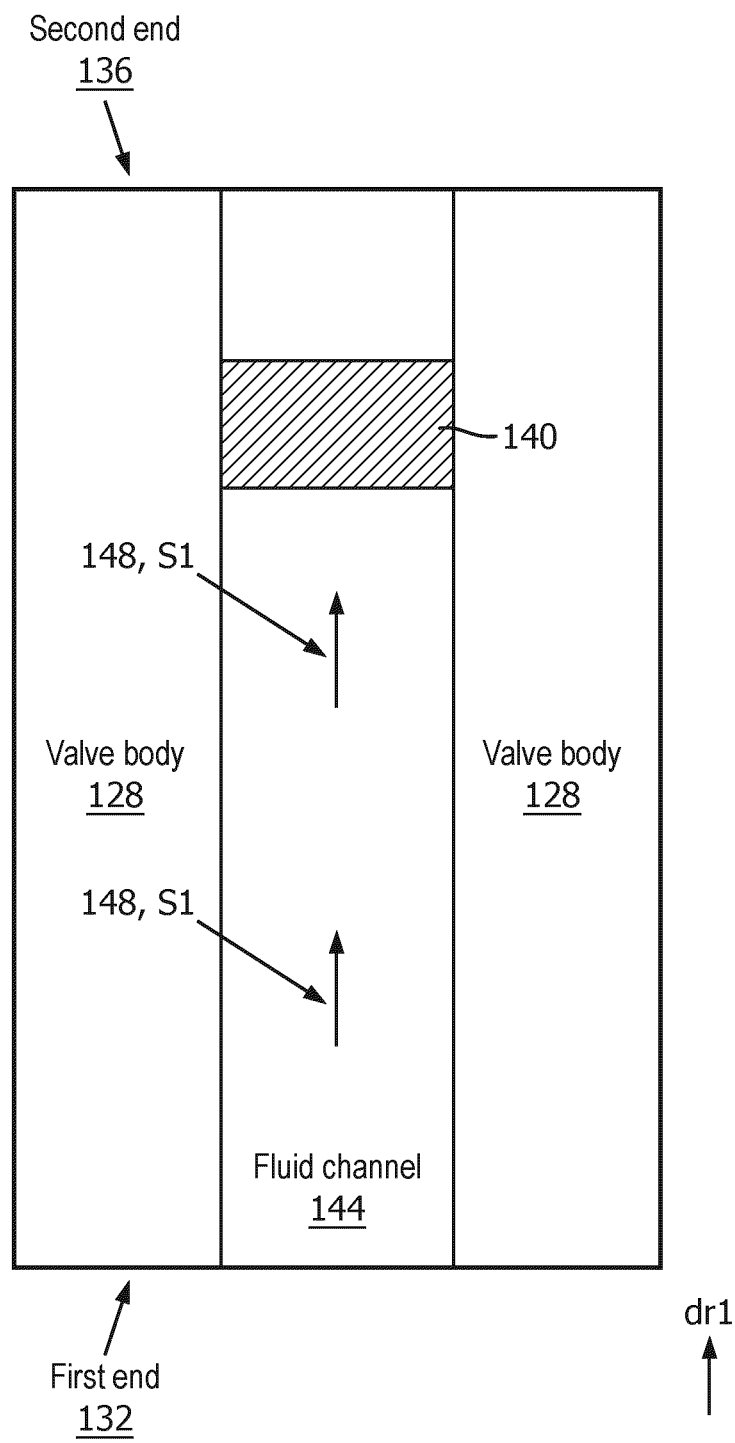
FIG. 5 is a schematic representation of the interior of a valve assembly according to aspects of the present disclosure.

As shown in FIG. 3 and FIG. 4, the pause control assembly 120 contains a valve assembly 124 which has a valve body 128 where the valve body 128 has a first end 132 and a second end 136. The valve body 128 also has a valve 140 positioned between the first end 132 of the valve body 128 and the second end 136 of the valve body 128. FIG. 5 is a schematic illustration of the interior of the valve body 128. The interior of the valve body 128 contains a fluid channel 144 through which fluid flow 148 can move, in a first direction dr1, from the first end 132 of the valve body to the second end 136 of the valve body, when the oral irrigator 104 (shown in FIG. 2) is in an on state S1. The valve 140 blocks the fluid channel 144 and blocks fluid flow 148 through the fluid channel 144 to the nozzle 109 (shown in FIG. 1) when the valve 140 is closed. The valve 140 can be arranged to completely block fluid flow 148 when the valve is completely closed and partially block fluid flow 148 when the valve 140 is partially closed.

Referring to FIG. 3, the pause control assembly 120 also has a slider 152, positioned outside the valve body 128, having a first end 154 and a second end 158, and a first protrusion 164 on the first end 154. The first protrusion 164 extends in the second direction dr2. The slider 152 also has a user contact 162 which is a protrusion on a surface 163 of the slider facing away from the valve body 128. The user contact 162 is designed to be accessible to the user of the oral irrigator 104 from the exterior of the housing 112. The user contact 162 can be a button, a slider, a protrusion, or any contact which can be shifted from one position to another position to shift the slider from a first position 156 to a second position 160 and/or from a second position 160 to a first position 156 (shown in FIG. 14 and FIG. 15).

Figure 6:
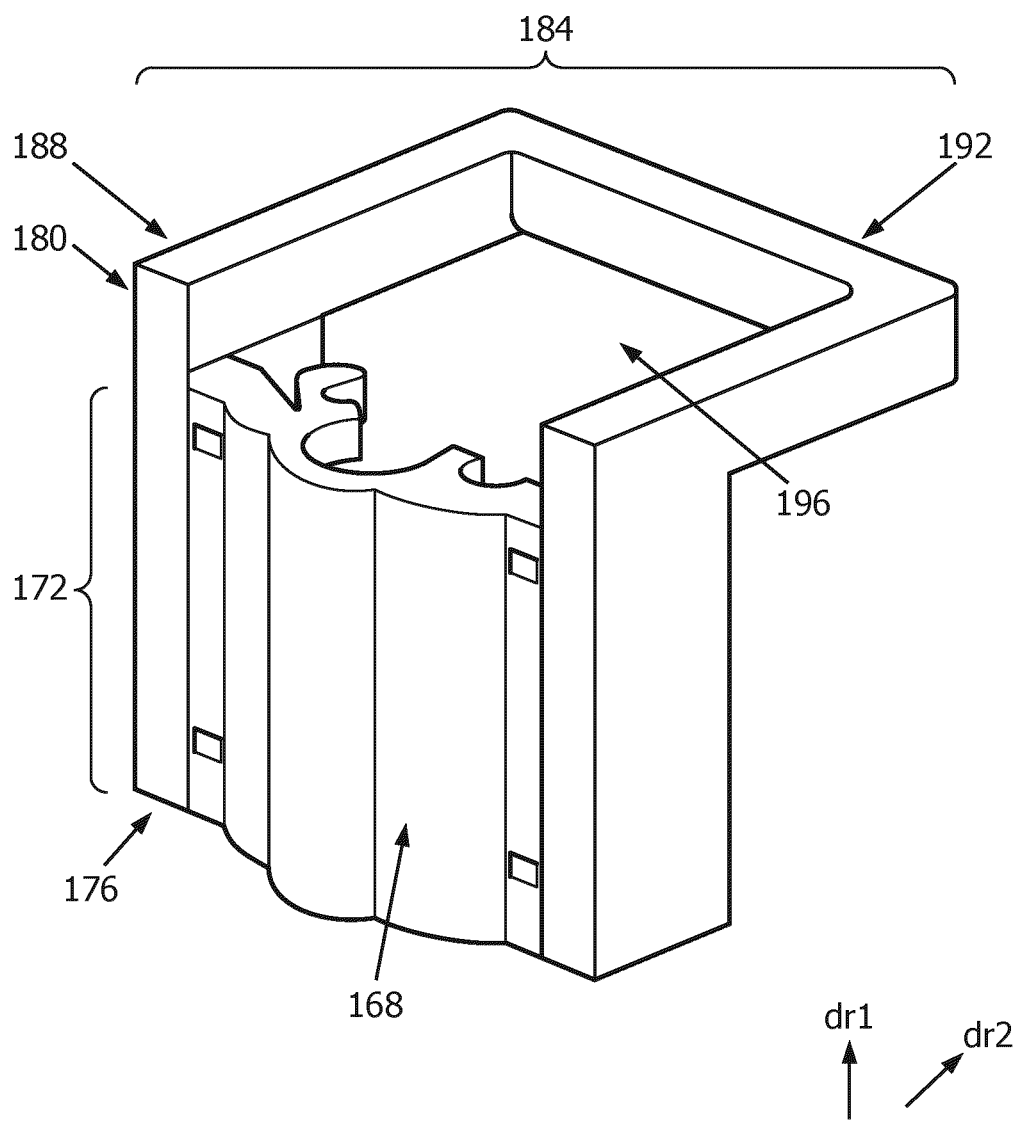
FIG. 6 is an illustration of a return according to aspects of the present disclosure.

The pause control assembly 120 further includes a return 168 which is positioned between the valve body 128 and the slider 152. As shown in FIG. 6, the first portion 172 of the return 168 extends in a first direction dr1, and the second portion 184 of the return 168 extends in a second direction, dr2, orthogonal to the first direction dr1. The first portion 172 has a first end 176 and a second end 180, on opposite ends of the first portion 172. The second portion 184 has a third end 188 and a fourth end 192, on opposite ends of the second portion 184. The second end 180 of the return 168 and the third end 188 of the return 168 are connected with each other and can be integrally connected to create one unit. As shown in FIG. 3, FIG. 4, and FIG. 6, the first protrusion 164 of the slider 152 makes contact with the first end 176 of the return 168. The second portion 184 of the return 168 has through bore 196, through which the valve body 128 is positioned, between the third end 188 and the fourth end 192 of the return 168.

Returning to FIG. 3, the pause control assembly 120 further includes a stopper 208 which is positioned outside the valve body 128 and opposite to the return 168 and slider 152. The valve body 128 also includes a resilient device 220, which is positioned on the exterior of the valve body 128 between the first end 132 and the second end 136 of the valve body 128. The resilient device 220 is positioned such that it makes contact with the return 168 on one end and makes contact with the valve body 128 on the opposite end. The resilient device 220 can be a spring, or the resilient device 220 can be any device capable of storing and releasing potential energy, or compressing and expanding, in response to the motion of the return 168.

As shown in FIG. 3 and FIG. 4, the pause control assembly 120 further includes a hinge 224 having a first hinge component 228 and a second hinge component 232. The first hinge component 228 is positioned on the valve body 128 between the first end 132 and the second end 136 of the valve body 128. The first hinge component 228 is fastened to the valve body 128 and oriented such that it can work in connection with the second hinge component 232 which is located on the stopper 208. The valve body 128 also includes a second biasing element 244 secured to the valve body 128 between the first end 132 and the second end 136. The second biasing element 244 is positioned such that it can make contact with the stopper 208. The second biasing element 244 can be a spring or any flexible material capable of storing and releasing potential energy. The second biasing element 244 is positioned such that it can apply a force 246 substantially in the second direction dr2.

Figure 7:
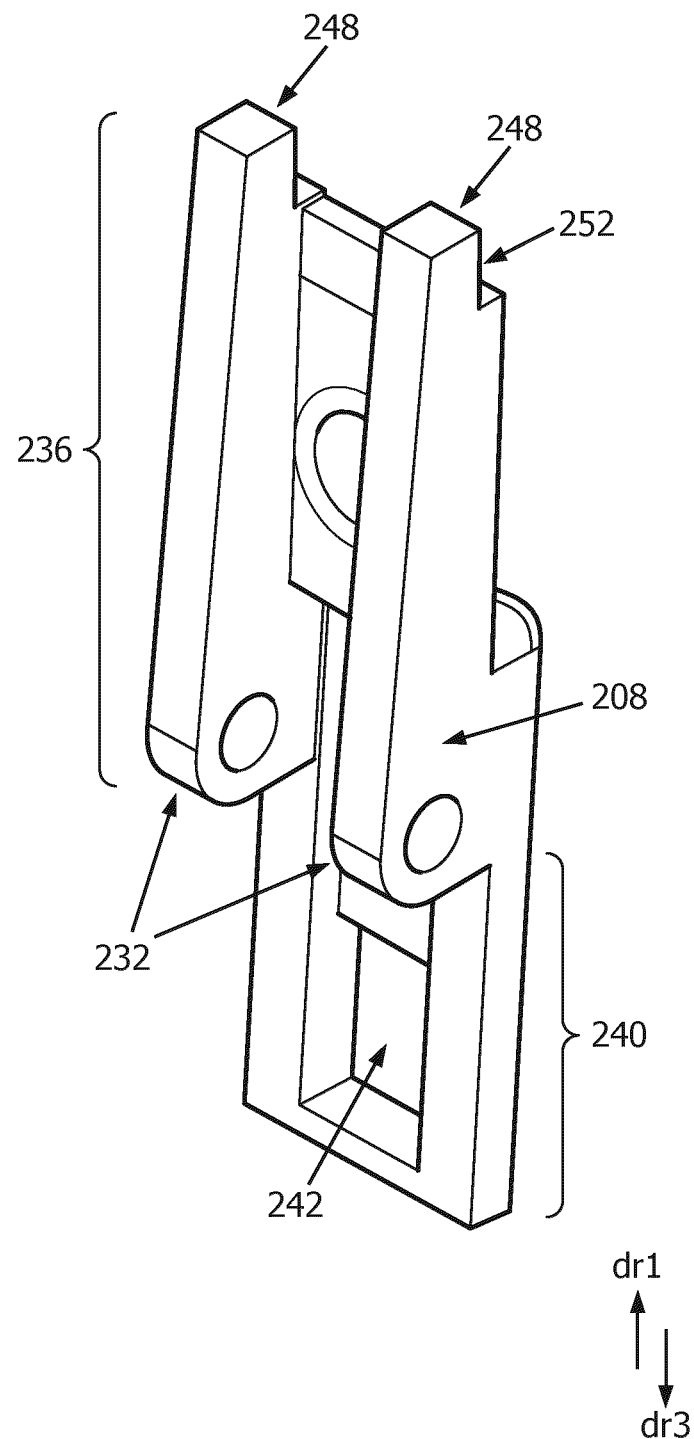
FIG. 7 is an illustration of a stopper according to aspects of the present disclosure.
Figure 8:
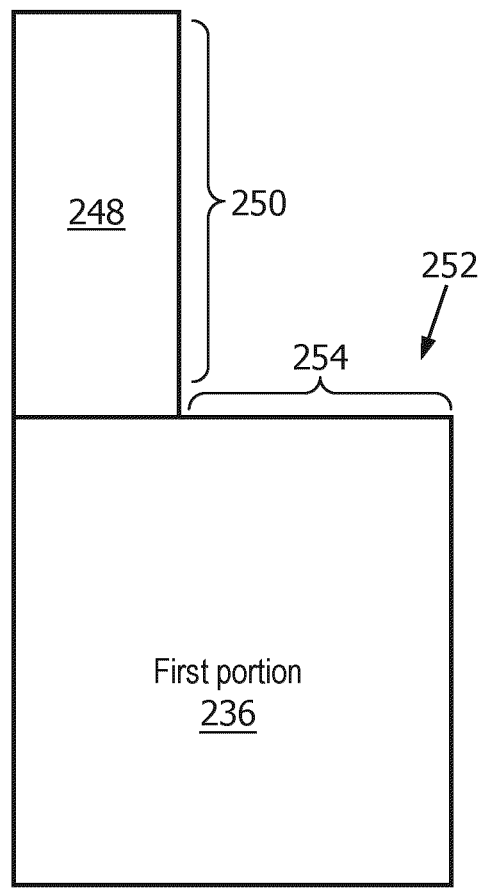
FIG. 8 is an illustration of a catch and ledge of a stopper according to aspects of the present disclosure.
Figure 8:
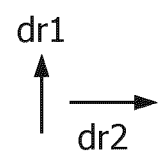

As illustrated in FIG. 7, the stopper 208 further comprises a first portion 236 which extends in the first direction dr1 from the second hinge component 232, and a second portion 240 which extends in the third direction dr3, opposite the first direction, from the second hinge component 232. The first portion 236 of the stopper has a catch 248 and a ledge 252 on the end of the first portion 236 opposite the end of the first portion 236 which has hinge component 232. As shown in FIG. 8, the catch 248 extends in the first direction dr1 and has a first surface 250 which extends along the first direction dr1 and faces the second direction dr2. The ledge 252 extends in the second direction dr2 and has a first surface 254 which extends along the second direction dr2 and has a surface which faces the first direction dr1. The first surface 254 of the ledge 252 does not extend in the second direction dr2 beyond the first portion 236 of the stopper 208. The first surface 250 of the catch 248 and the first surface 254 of the ledge 252 are positioned such that they are adjacent and perpendicular to each other and create a cavity in the space opposite and between the first surface 250 and first surface 254.

Figure 9:
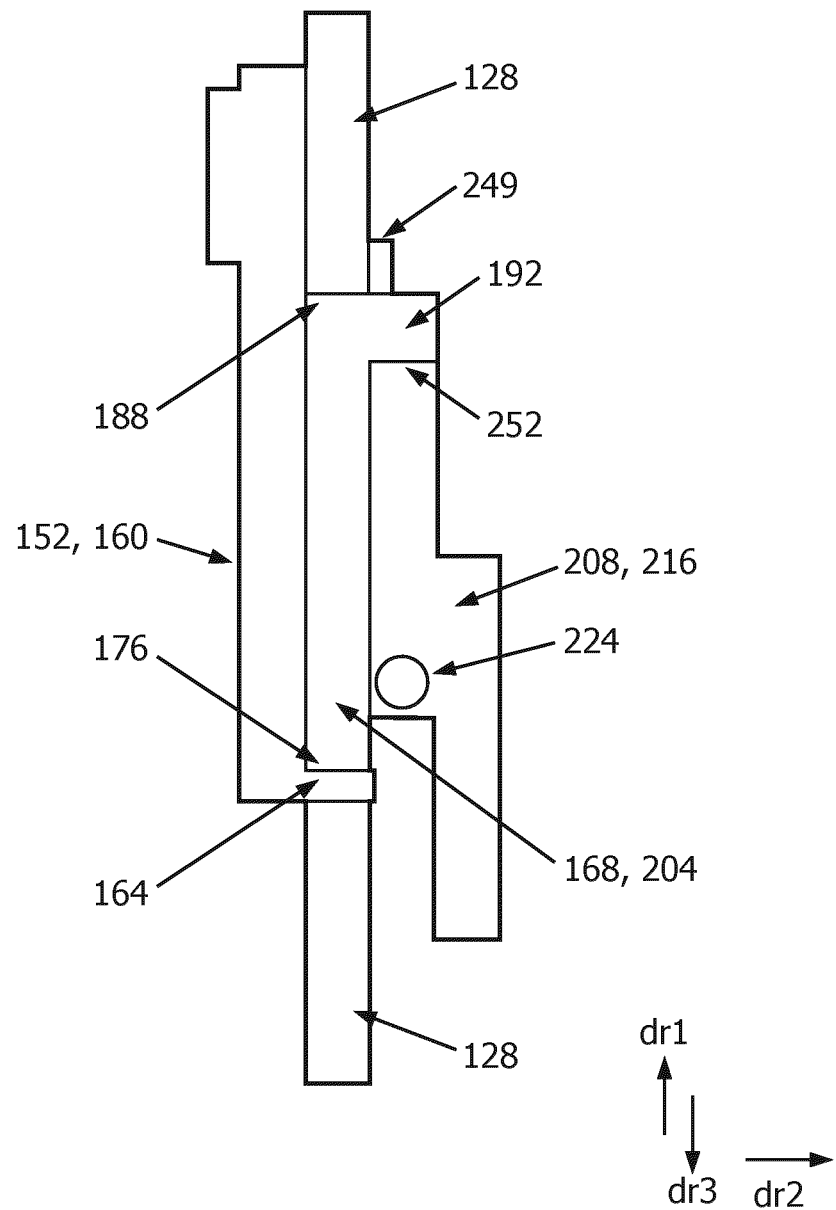
FIG. 9 is a schematic representation of a pause control assembly according to aspects of the present disclosure.

FIG. 9 is a schematic representation of the components of the pause control assembly 120. The slider 152 is in the second position 160 (which corresponds to an open valve 140). Adjacent to the slider 152 in the second direction dr2 is the return 168. The return 168 is also in its second position 204. The first protrusion 164 of the slider 152 makes contact with the first end 176 of the return 168. The valve body 128 is received in the through bore 196 (not shown) of the return 168 between the third end 188 and the fourth end 192 of the return 168. The stopper 208 is in its second and closed position 216. The stopper 208 is arranged such that catch 248 and the ledge 252 positioned on the first portion 236 of the stopper 208 receive the fourth end 192 of the return 168. The catch 248 applies a force on the return 168 in the second direction dr2. The ledge 252 of the stopper 208 applies a force on the return 168 in the first direction dr1 and prevents the return 168 from moving in the third direction dr3. The return 168 is in the locked state.

Figure 10:
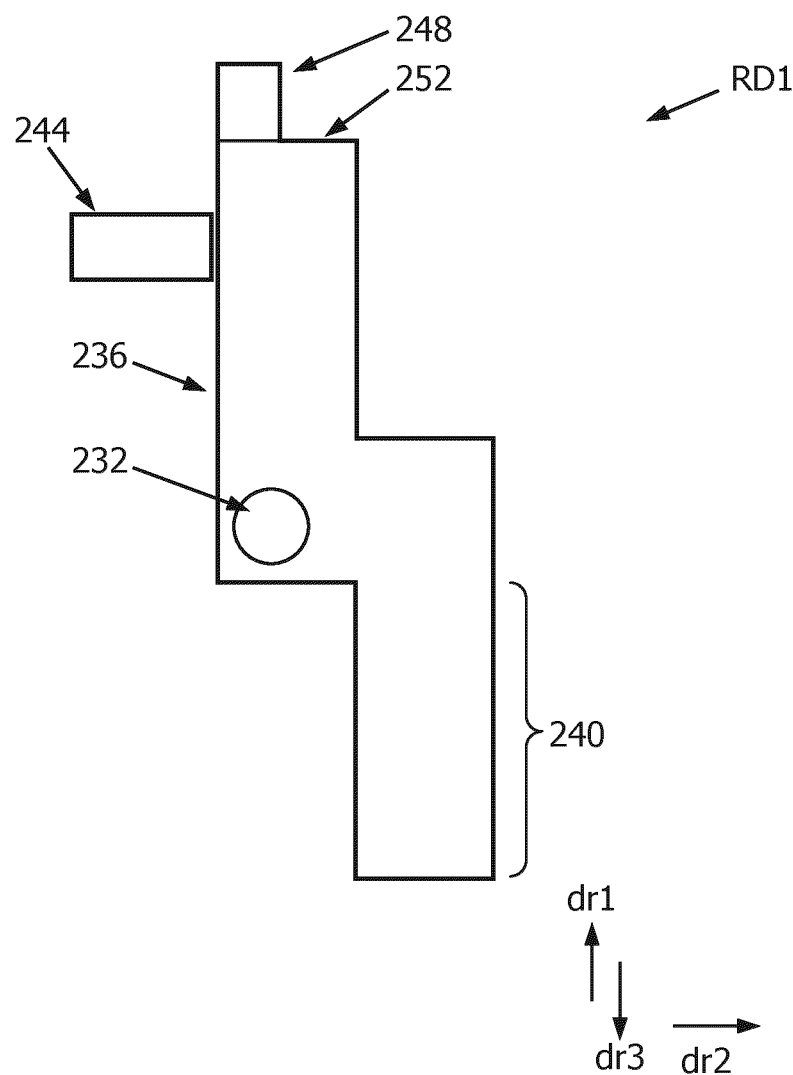
FIG. 10 and FIG. 11 are schematic representations of a stopper according to aspects of the present disclosure.
Figure 11:
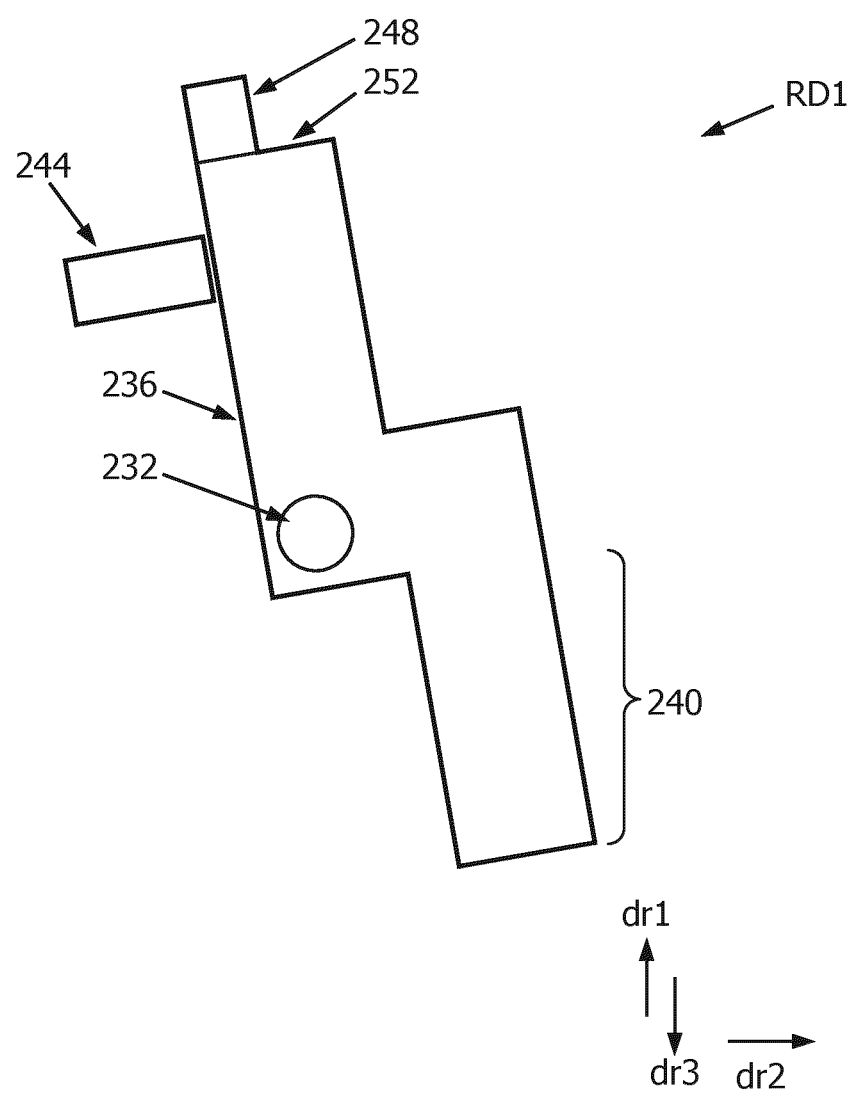

Referring to FIG. 10 and FIG. 11, as the return 168 (not shown in FIG. 10 and FIG. 11) moves from its first position 200 to its second position 204, and moves in the first direction dr1, along the stopper 208, the stopper rotates in the first rotational direction RD1 about the hinge 224. This compresses the second biasing element 244, 232 which applies a force against the stopper 208 in the second direction dr2. As the fourth end of the return 192 moves in the first direction dr1, it falls into the cavity created by the catch 248 and ledge 252 of the stopper. The force against the stopper 208 in the second direction dr2 from the second biasing element 244 and the force applied by the catch 248 in the second direction dr2 prevent the stopper from rotating further in the first rotational direction rd1 and the through bore 196 of the return 168 from extending past the ledge 252 of the stopper 208. The return is prevented from moving in the third direction dr3 opposite the first direction dr1. When the second portion 240 of the stopper 208 is pulled in the second direction dr2 further, and the stopper 208 rotates along the hinge 224, 232 further in the first rotational direction DR1, the through bore 196 of the return 168 moves past the ledge 252 of the stopper 208, and the return can move along the third direction dr3.

Figure 12:
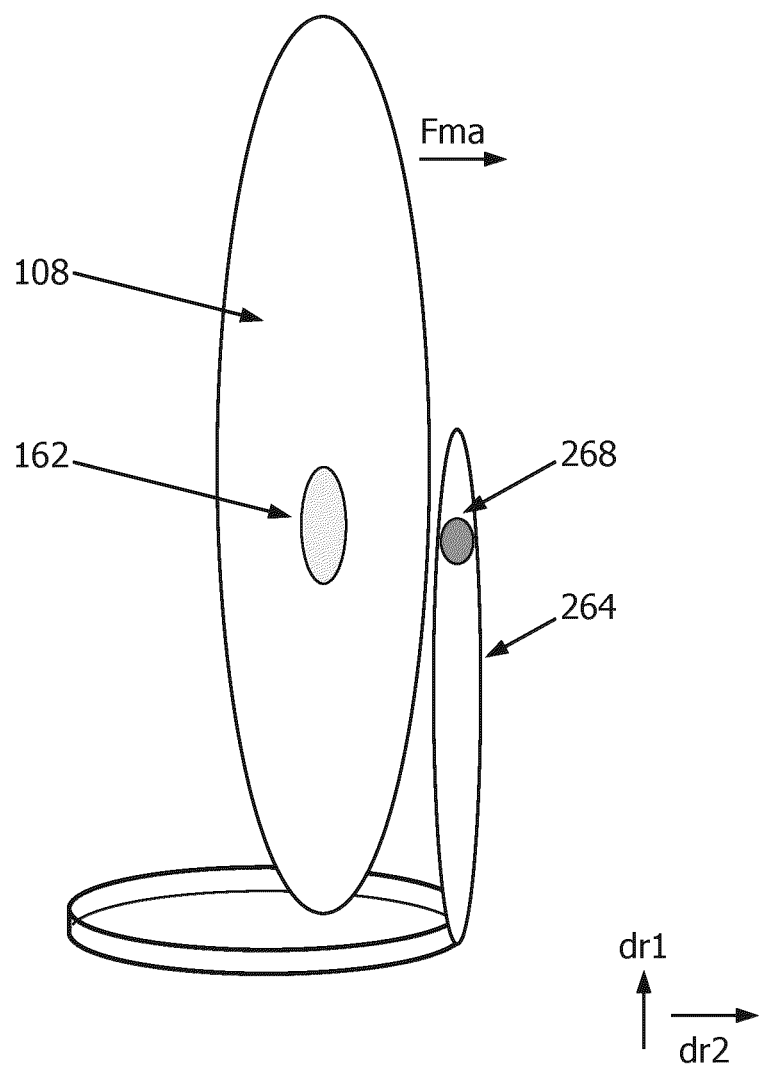
FIG. 12 and FIG. 13 are schematic representations of oral irrigator stands according to aspects of the present disclosure.
Figure 13:
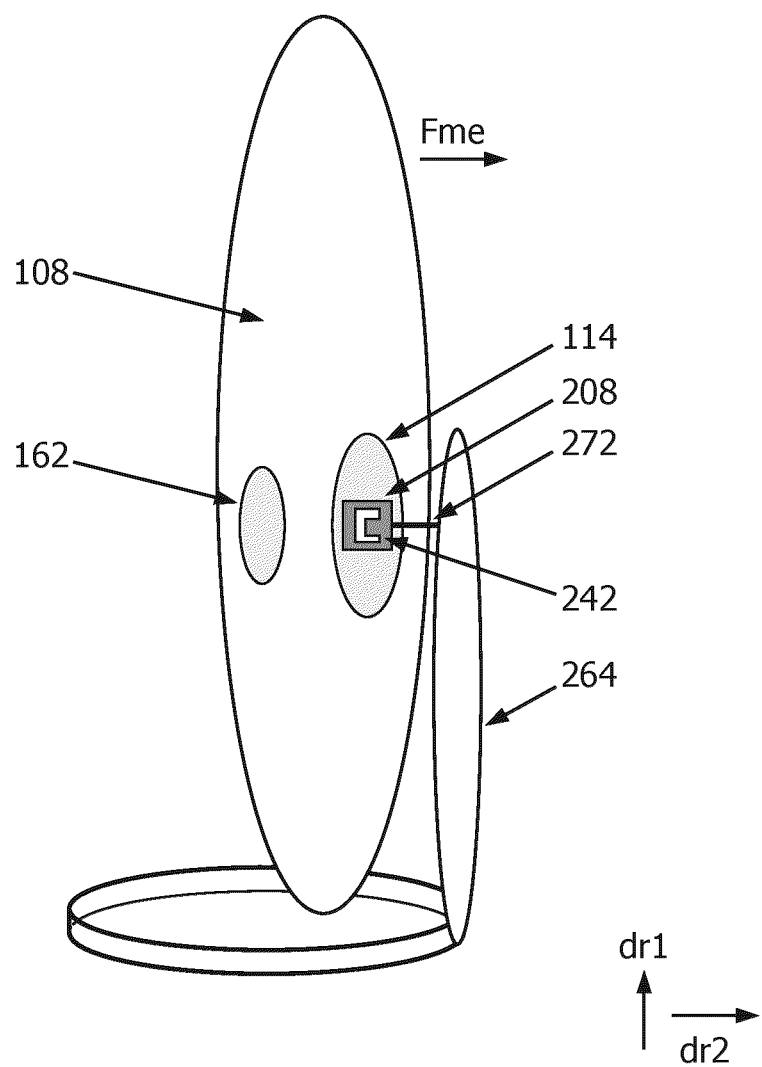

Referring to FIG. 12 and FIG. 13, the oral irrigator system 100 further includes a stand 264 which is arranged to receive the oral irrigator handle 108. The stand 264 is shaped to have an exterior where the oral irrigator handle 108 can be placed in a fixed and regular position. In an example, (shown in FIG. 12) the stand 264 includes a magnet 268 arranged in or on the stand 264 such that it is proximate to the pause control assembly 120 located inside the housing 112 of the oral irrigator handle 108. The magnet 268 is arranged to apply a force Fina, towards the magnet 268, on the second portion 240 of the stopper 208 of the pause control assembly 120 and in the second direction dr2 away from the valve body 128 of the pause control assembly 120 located in the housing 112. In another example, (shown in FIG. 13) the stand 264 includes a mechanical protrusion 272 positioned on the exterior of the stand 264 and arranged such that it can make contact with the oral irrigator handle 108. The mechanical protrusion 272 makes contact with the stopper 208 of the pause control assembly 120 through a through bore 114 of the housing 112 and through a through bore 242 of the second portion 240 of the stopper 208 such that the mechanical protrusion applies a force Fme on the stopper 208 in the second direction dr2 away from the valve body 128 of the pause control assembly 120 and towards the stand 264.

Figure 14:
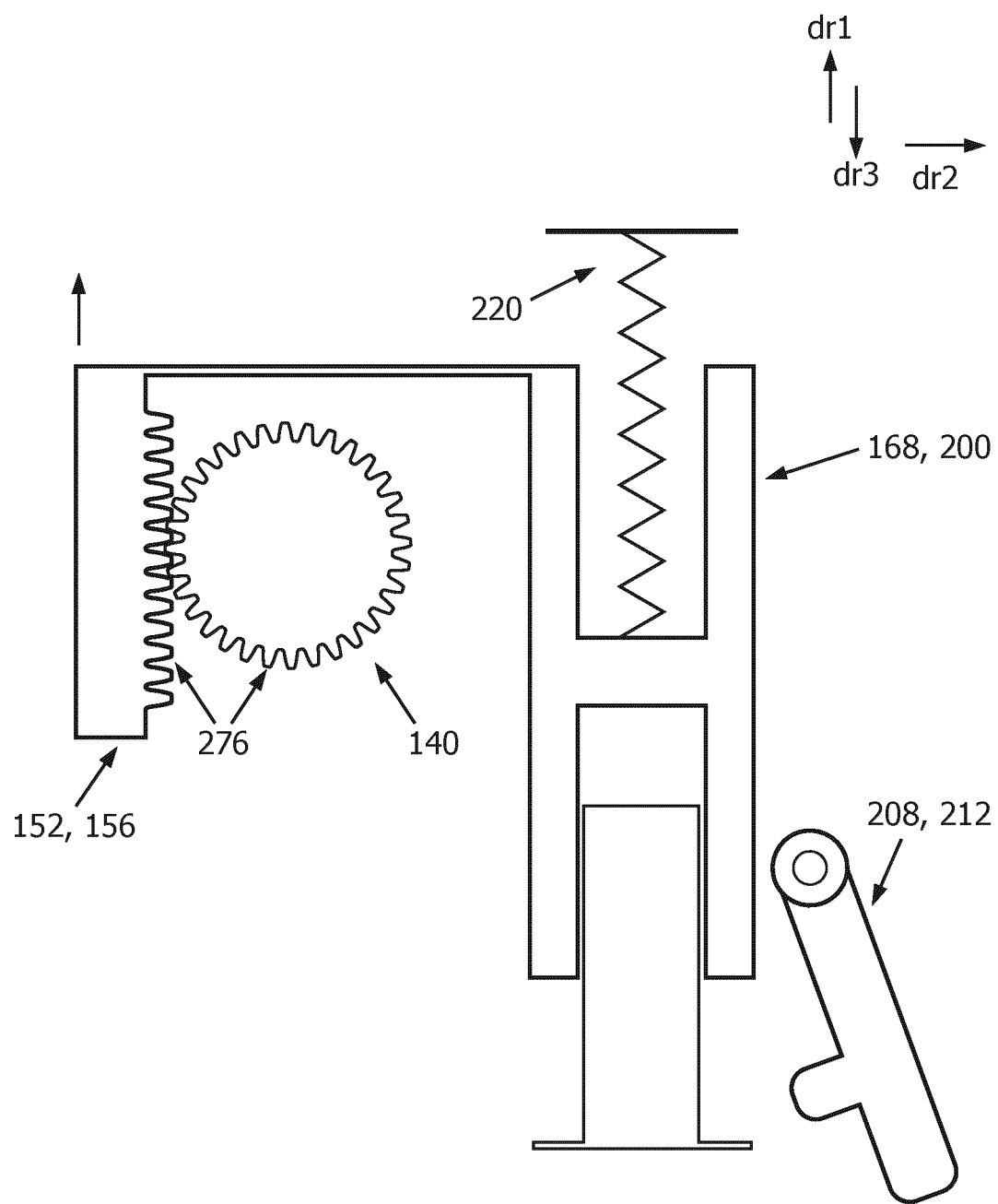
FIG. 14, FIG. 15, FIG. 16, and FIG. 17 are schematic drawings which illustrate how the components of the pause control assembly work together.
Figure 15:
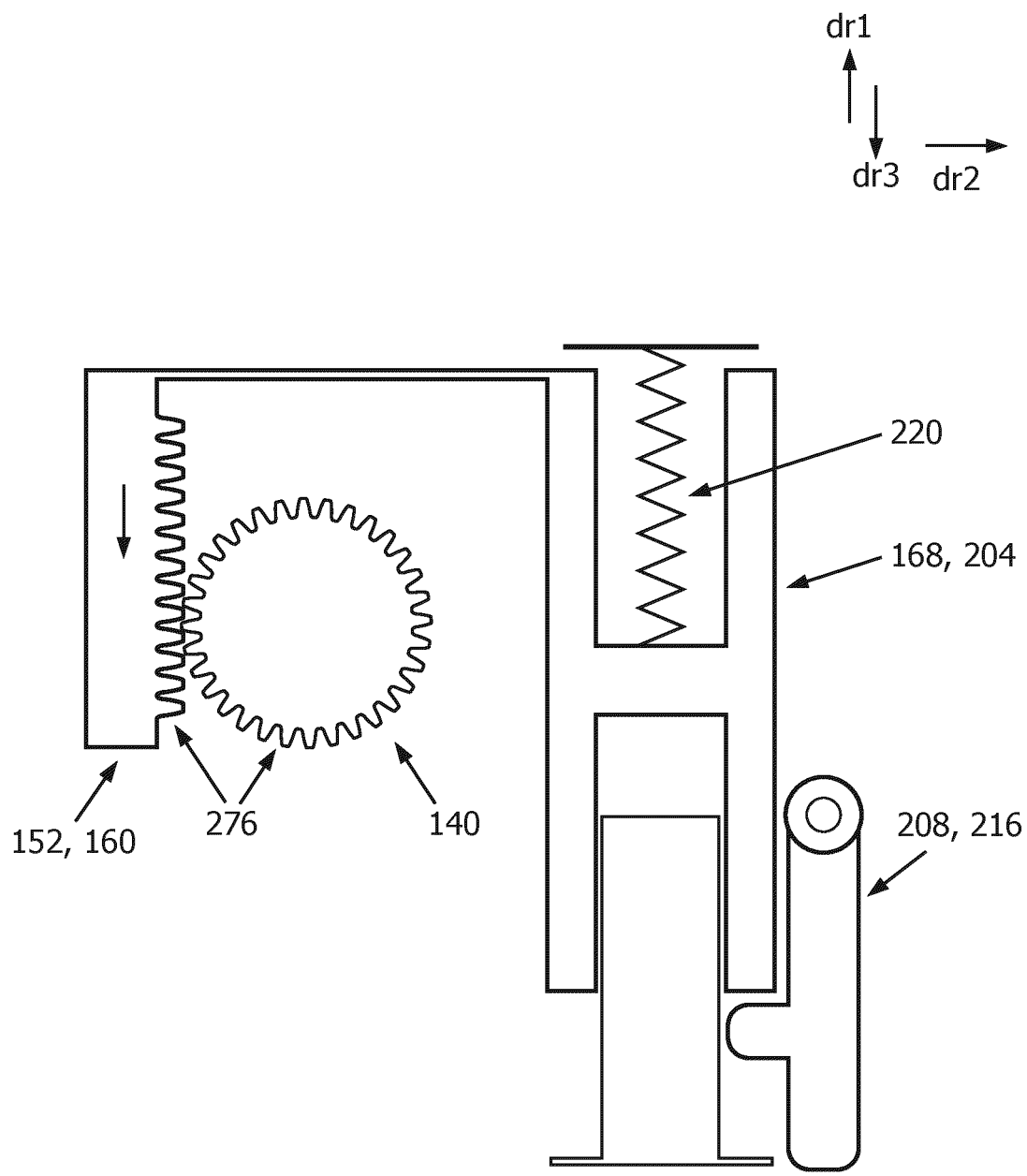

FIG. 14 provides a schematic representation of parts of the pause control assembly 120. The slider 152 is in contact with the valve 140 using a toothed contact 276 (see also FIG. 3) on the slider 152 and the valve 140, so that the valve 140 can move and be opened and closed when the slider 152 moves. The slider 152 and return 168 are also connected with each other, so that when the slider 152 moves along the first direction dr1, the return 168 can move along with the slider 152. As shown in FIG. 3, FIG. 4, and FIG. 9, the first protrusion 164 of the slider 152 makes contact with the first end 176 of the return 168, so that when the slider 152 moves in the first direction dr1 from its first position 172 to its second position 176 (as shown in FIG. 15), the slider 152 moves the return 168 in the first direction dr1. When the slider 152 moves in the third direction dr3, the slider 152 does not move the return 168 along in the third direction dr3. The contact between the first protrusion 164 of the slider 152 and the first end 176 of the return 168 does not create a force in the third direction dr3 on the return 168.

As shown in FIG. 14 and FIG. 15, when the slider 152 is moved from the first position 156 to the second position 160 (shown in FIG. 15), the valve 140 is also changed from the closed state to the open state (shown in FIG. 15). The return 168, which is in contact with the slider 152 such that it moves along with the slider 152 in the first direction dr1, also moves from its first position 200 to its second position 204 (shown in FIG. 15). When the valve 140 is open fluid flow 148 through the fluid channel 144 moves through to the nozzle 109. As shown in FIG. 15, fluid flow 148 through the fluid channel 144 can be paused by moving the slider 152 from the second position 160 to the first position 156, which shifts the valve from the open to the closed state. When the return 168 moves from the first position 200 to the second position 204, the return 168 compresses the resilient device 220 (shown in FIG. 15), which now stores potential energy which can be released. Additionally, when the return 168 moves to the second position 204, the stopper shifts from the first and open position 212 (shown in FIG. 14) to the closed and second position 216.

Figure 16:
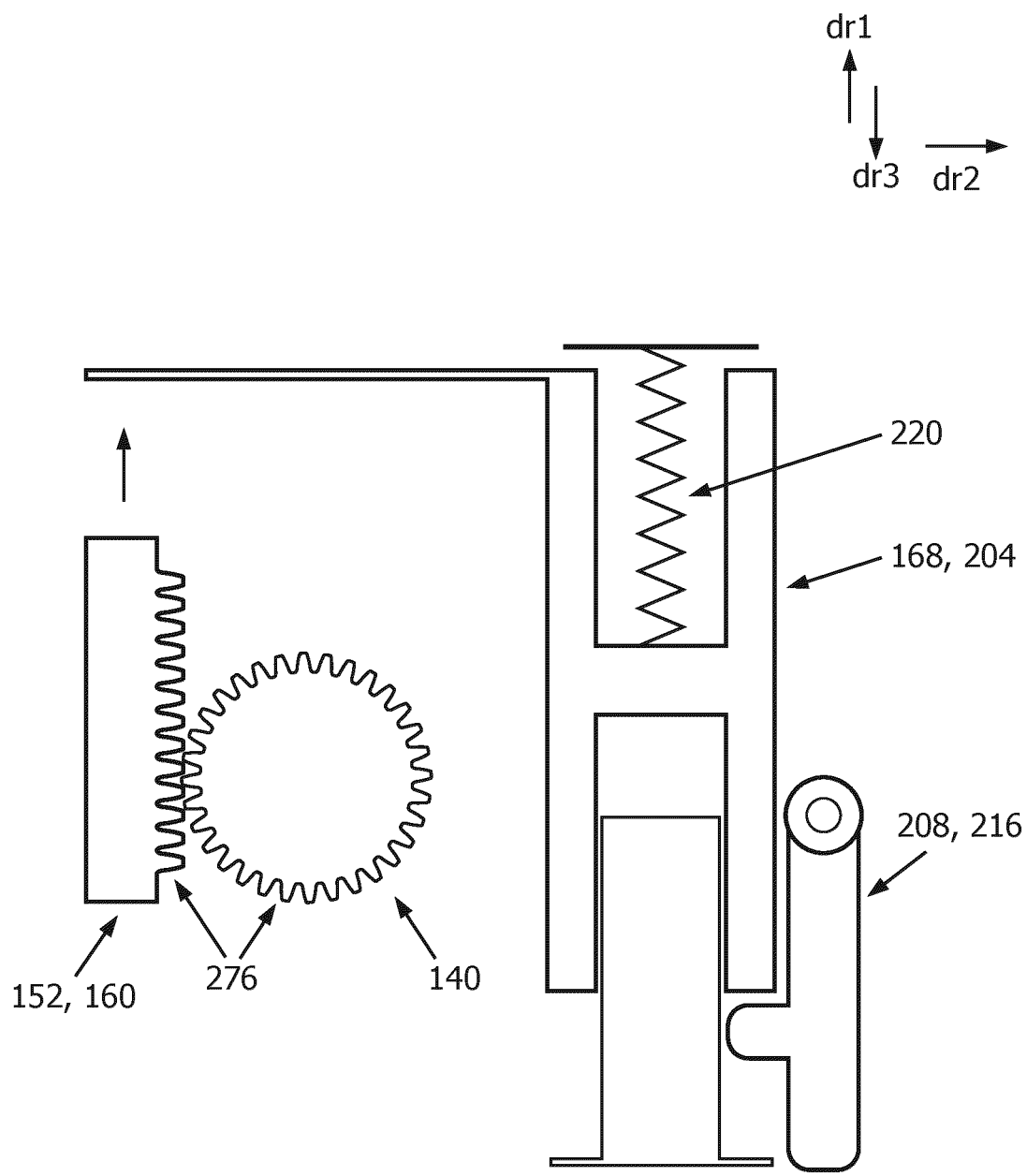
Figure 17:
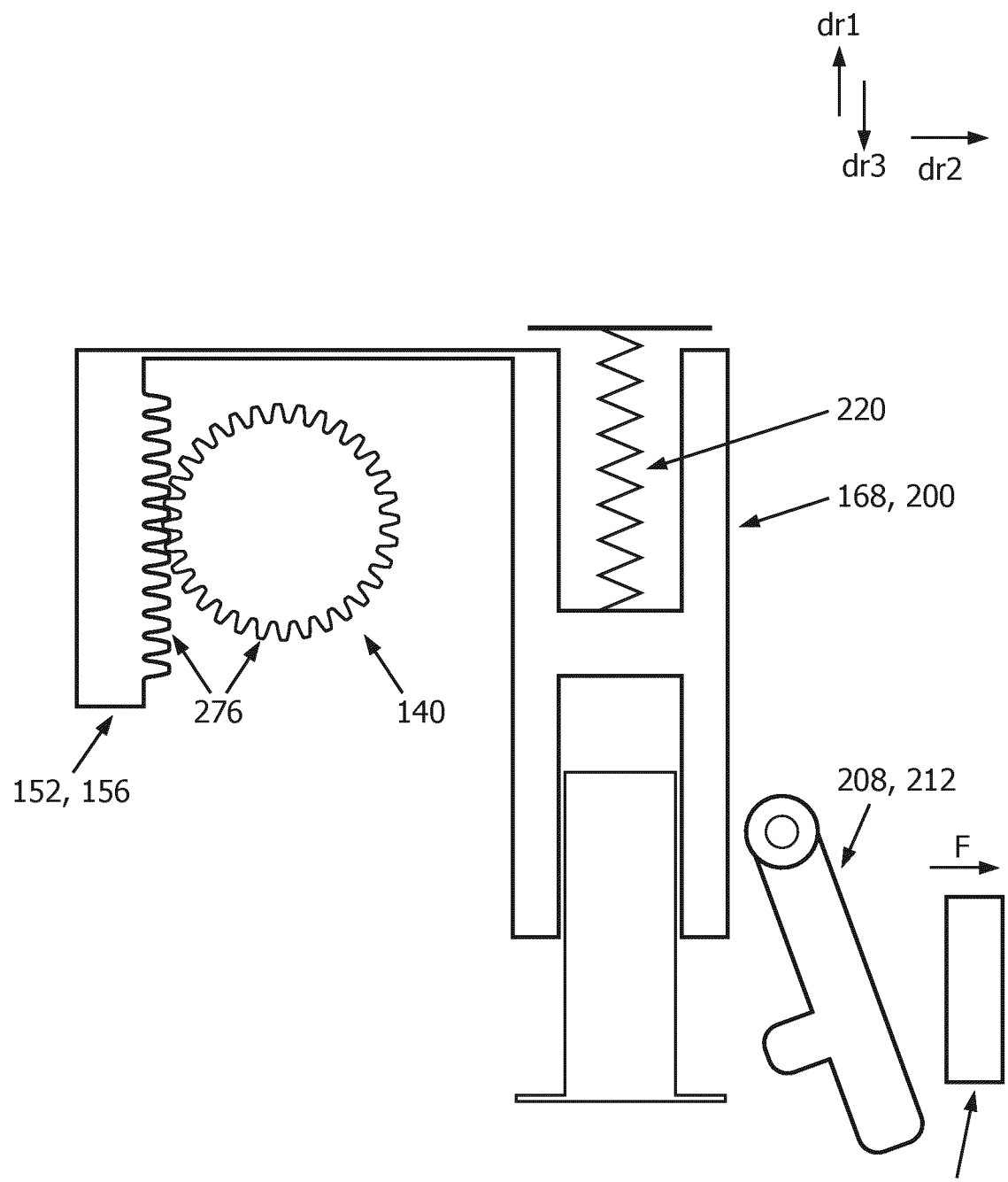

As shown in FIG. 16, fluid flow 148 through the fluid channel 144 to the nozzle 109 can be resumed by moving the slider 152 from the first position 156 to the second position 160, which shifts the valve 140 from the closed to the open state. As shown in FIG. 16 and FIG. 17, after the slider 152 moves to the second position 160, and the stopper is in the second and closed position 216, which locks the return 168, the return 168 does not move and the resilient device 220 remains in the compressed state storing potential energy. FIG. 17 shows how the stopper is unlocked, or moved from the closed and second position 216 to the open and first position 212. When the oral irrigator handle 108 is placed in the stand 264 (as shown in FIG. 12 and FIG. 13), a force F is applied in the second direction dr2, towards the stand 264.

This force moves the stopper 208 towards the stand 264 and from the closed position 216 to the open position 212. The return 168 is no longer prevented from moving. The potential energy stored in the compressed resilient device 220 is released and the resilient device 220 expands. The resilient device 220, which is in contact with the return 168 (as shown in FIG. 3), moves the return 168 from the second position 204 to the first position 200. As the return 168 and the slider 152 make contact where the first protrusion 164 of the slider 152 and the first end 176 of the return 168 meet, the force from the resilient device 220 on the return 168 in the third direction dr3 also moves the slider 152 from the second position 160 to the first position 156, which moves the valve 140 from the open state to the closed state. If the valve 140 is already in the closed state, and the slider is in the first position 156, when the handle 108 is placed on the stand 264, the resilient device 220 applies a force on the return 168 moving it from the second position 204 to the first position 200, such that the return 168 and slider 152 are now in contact with each other where the first protrusion 164 meets the first end 176 of the slider 152.

FIG. 18 and FIG. 19 show an exemplary oral irrigator handle 300 with a pause control reset mechanism. The oral irrigator handle 300 contains a housing 304 with a cavity 306 which contains a fluid channel 308. As illustrated in FIG. 19, when the oral irrigator 104 (shown in FIG. 1) is in an on state S1, fluid flow 312 moves in a first direction dr1 which is substantially parallel with a first axis 316. The oral irrigator handle 300 contains a valve 320 which is arranged to inhibit fluid flow 312 through the fluid channel 308 to the nozzle 109 when the valve 320 is closed 396 (shown in FIG. 18) and permit fluid flow 312 to the nozzle 109 when the valve 320 is open 392 (shown in FIG. 19). The cavity 306 contains a pressure plate 324 and a pressure chamber 328 (shown in FIG. 19) adjacent to the fluid channel 308 which are arranged to respond to a change in pressure in the fluid channel 308 due to fluid flow 312. The pressure plate 324 extends in the first direction dr1, and has a surface which faces the second direction dr2 or the third direction dr3, which are both orthogonal to the first direction dr1. Adjacent to pressure plate 324, and on the opposite side of the pressure plate 324 as the fluid channel 308, there is a resilient device 332 which is arranged to compress in the second direction dr2 or the third direction dr3 in response to fluid pressure in the fluid channel 308 which causes a first force Fp in the second direction dr2 or the third direction dr3 against the surface of the pressure plate 324. As the first force Fp is applied against the pressure plate 324 and the pressure plate 324 moves, the resilient device 332 is compressed. The resilient device 332 can be a spring, or any device capable of storing and releasing potential energy.

As shown in FIG. 19, a gated path component 336 is positioned in the cavity 306, adjacent to the pressure plate 324 and the resilient device 332 along a fourth direction dr4 which is orthogonal to the first direction dr1 and the second dr2 and third dr3 directions. As illustrated in FIG. 20, the gated path component 336 has a body 340 with a first channel 344 and a second channel 356. The first channel 344 extends in the second direction dr2 or the third direction dr3, and has a first end 348 and a second end 352. The second channel 356 extends in first direction dr1, at a first angle 382 with respect to the first axis 316, and has a third end 360 and a fourth end 364. The second end 352 of the first channel 344 and the third end 360 of the second channel 356 are integrally connected with each other.

Referring to FIG. 18 and FIG. 19, a guide pin 372, which extends in the fourth direction dr4, is positioned between the pressure plate 324 and the resilient device 332 and in the body 340 of the gated path component 336. The guide pin 372 is positioned in the body 340 of the gated path component 336, and can move along first channel 344 and the second channel 356 of the gated path component 336. The movement of the guide pin 372 is restricted by the pressure plate 324 and the resilient device 332 as the guide pin 372 is positioned between the pressure plate 324 and the resilient device 332. On the exterior of the oral irrigator housing 304, there is a slider 368 which can move from a first position 400 (shown in FIG. 18) to a second position 404 (shown in FIG. 19). The first position 400 of the slider 368 corresponds to the closed state 396 of the valve 320 (shown in FIG. 18). The second position 404 of the slider 368 corresponds to the open state 392 of the valve 320 which permits fluid flow 312 through the valve 320 (shown in FIG. 19). A tab 376 is located within the cavity 306 of the oral irrigator handle 300 and is fixedly secured to the slider 368. The tab 376 has a third channel 380, which extends in the second direction dr2 or third direction dr3, and the guide pin 372 is arranged so that it can slide along the third channel 380.

When the oral irrigator is turned off and is in the off state S2, there is no fluid flow 312 through the fluid channel 308 of the oral irrigator handle (FIG. 18). As shown in FIG. 19, when the oral irrigator is turned on and in the on state S1, fluid flow 312 begins through the fluid channel 308 creating a first force Fp in the fluid channel 308. The first force Fp pushes against the surface of the pressure plate 324 and moves the pressure plate 324 in the second or third directions dr2 or dr3, which are orthogonal to the first direction dr1 along which the fluid flow 312 moves. This first force Fp moves the pressure plate 324 and compresses the resilient device 332. The guide pin 372 is positioned between the pressure plate 324 and the resilient device 332 and also experiences Fp. The guide pin 372 is arranged to move along the third channel 380 of the tab and the first channel 344 and second channel 356 of the gated path component 336. When the oral irrigator is in the off state S2, and the slider 368 is in the first position 400 (corresponding to a closed valve 396), the third channel 380 of the tab 376 and the first channel 344 of the gated path component 336 are aligned so that the guide pin 372 can move along the third channel 380 in the second or third directions dr2 or dr3, and can move along the first channel 344 of the gated path component 336, from the first end 348 to the second end 352 (see FIG. 18 and FIG. 20).

Referring to FIG. 18 and FIG. 19, when the oral irrigator is in the on state S1 and a first force Fp increases in the fluid channel 308, the pressure plate 324 moves away from the fluid channel 308, and the guide pin 372 can move along the third channel 380 in the second or third directions dr2 or dr3, and can move along the first channel 344 of the gated path component 336, from the first end 348 to the second end 352. Once the guide pin 372 reaches the second end 352 of the first channel 344 of the gated path component 336, the guide pin 372 can move along the second channel 356 of the gated path component 336. This (guide pin 372 being able to move along the second channel 356) corresponds to an unlocked state S3. Because the slider 368 is connected to the guide pin 372 by the tab 376, only once the guide pin 372 reaches the second channel 356 of the gated path component 336 can the slider 368 be moved from the first position 400 (FIG. 18) to the second position 404 (FIG. 19), along the first direction dr1. Therefore, the slider can only be moved to the second position 404 corresponding to the open state of the valve 392, when the power of the oral irrigator is on S1, and after the first force Fp moves the guide pin 372 to the second channel 356 of the gated path component 336. As the slider is moved from the first position 400 to the second position 404, opening the valve 320 and permitting fluid flow 312 through the fluid channel 308 and into a nozzle 109 (shown in FIG. 2), the guide pin 372 moves along the second channel 356 of the gated path component 336 from the third end 360 to the fourth end 364. When there is fluid in the fluid channel 308 creating a first force Fp against the pressure plate 324, and the guide pin 372 can move along the second channel 356 of the gated path component, the slider 368 can be moved by the user between the first position 400 and the second position 404 and back to the first position 400, pausing and unpausing the flow of fluid to the nozzle 109 (see FIG. 19 and FIG. 20).

When the oral irrigator is turned off and the slider 368 is in the second position 404 (corresponding to an open valve 392), fluid flow 312 through the fluid channel 308 decreases and the force Fs (shown in FIG. 18) from the compressed resilient device 332, moves the pressure plate 324 towards the fluid channel 308. The force Fs from the expanding resilient device 332 moves the guide pin 372 along the second channel 356 of the gated path component 336 along the path from the fourth end 364 to the third end 360 (shown in FIG. 20). The second channel 356 is positioned at a first angle 382 with respect to a first axis 316, and as the guide pin 372 moves along the second or third directions dr2 or dr3 towards the fluid channel 308, the guide pin 372 also moves in the direction opposite to the first direction because of the angled orientation of the second channel 356. The force Fs of the expanding resilient device 332 moves the guide pin 372 along the second channel 356 of the gated path component 336 to the first channel 344. The guide pin 372 is connected to the tab 376 which is connected to the slider 368, and the slider 368 moves from the second position 404 to the first position 400 (corresponding to a closed valve 396). Once the guide pin 372 is in the first channel 344, it can move along the second or third direction dr2 or dr3 towards the fluid channel 308 along the third channel 380 of the tab 376 and along the first channel 344 of the gated path component 336, from the second end 352 to the first end 348. The guide pin 372 is positioned between the pressure plate 324 and the resilient device 332 so that as the resilient device 332 expands and moves the guide pin 372, the pressure plate 324 also moves towards the fluid channel 308. When the resilient device 332 has expanded and the guide pin 372 is located at the first end 348 of the gated path component, this corresponds to the locked state S4 (shown in FIG. 18). The slider 368 cannot be moved to the second position 404 corresponding to an open valve 392 until a first force Fp builds up in the fluid channel 308 due to fluid flow 312 when the oral irrigator is powered on.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of."

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified.

It should also be understood that, unless clearly indicated to the contrary, in any methods claimed herein that include more than one step or act, the order of the steps or acts of the method is not necessarily limited to the order in which the steps or acts of the method are recited.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

While several inventive embodiments have been described and illustrated herein, those of ordinary skill in the art will readily envision a variety of other means and/or structures for performing the function and/or obtaining the results and/or one or more of the advantages described herein, and each of such variations and/or modifications is deemed to be within the scope of the inventive embodiments described herein. More generally, those skilled in the art will readily appreciate that all parameters, dimensions, materials, and configurations described herein are meant to be exemplary and that the actual parameters, dimensions, materials, and/or configurations will depend upon the specific application or applications for which the inventive teachings is/are used. Those skilled in the art will recognize, or be able to ascertain using no more than routine experimentation, many equivalents to the specific inventive embodiments described herein. It is, therefore, to be understood that the foregoing embodiments are presented by way of example only and that, within the scope of the appended claims and equivalents thereto, inventive embodiments may be practiced otherwise than as specifically described and claimed. Inventive embodiments of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the inventive scope of the present disclosure.

The invention claimed is:

1. An oral irrigator system (100), comprising:
an oral irrigator (104) comprising an oral irrigator handle (108), wherein the oral irrigator handle further comprises a housing (112), the housing having a cavity (116) arranged therein, the cavity comprising a pause control assembly (120), the pause control assembly comprising:
a valve (140);
a slider (152) coupled to the valve, wherein the slider is configured to move between a first position (156) and a second position (160), the slider further comprising a first protrusion (164);
a return (168) comprising:
a first portion (172) extending in a first direction, the first portion having a first end (176) and a second end (180), wherein the first end is in contact with the first protrusion of the slider; and
a second portion (184) extending in a second direction orthogonal to the first direction, the second portion having a third end (188) and a fourth end (192), wherein the second portion further comprises a through bore (196) arranged to receive a valve body (128);
wherein the second end of the first portion and the third end of the second portion are connected with each other; and
a stopper (208), having an open position (212) and a closed position (216), wherein the stopper (208) is arranged to prevent motion of the return (168) in a third direction opposite the first direction,
wherein the pause control assembly (120) is configured such that the first position (156) of the slider (152) corresponds to a closed state of the valve (140) and the second position (160) of the slider corresponds to an open state of the valve, wherein when the slider is moved from the first position to the second position, the return (168) is moved from a first position (200) to a second position (204), and when the return is moved to the second position, the stopper (208) is arranged to engage and secure the fourth end (192) of the return.

2. The oral irrigator system of claim 1, wherein the pause control assembly (120) further comprises a resilient device (220) arranged to bias the return (168) in the third direction opposite the first direction.

3. The oral irrigator system of claim 1, wherein the pause control assembly (120) further comprises a hinge (224), the hinge comprising:
a first hinge component (228) arranged on the valve body (128); and
a second hinge component (232) arranged on the stopper (208);
wherein the hinge is configured to allow the stopper to rotate in a first rotational direction and a second rotational direction opposite the first rotational direction.

4. The oral irrigator system of claim 3, wherein the stopper (208) further comprises a first portion (236) extending in the first direction from the second hinge component (232) and a second portion (240) extending in the third direction from the second hinge component.

5. The oral irrigator system of claim 4, further comprising the valve body (128) having a second biasing element (244) arranged to bias the first portion (236) of the stopper in the second direction; and
wherein when the return (168) is in the second position (204), the stopper is arranged to rotate in the first rotational direction about the hinge (224) and engage and secure the fourth end (192) of the return in a locked state; and
wherein the first portion of the stopper (208) further comprises a catch (248) protruding in the first direction and a ledge (252) protruding in the second direction, wherein the ledge is arranged to apply a force in the first direction and the catch is arranged to apply a force in the second direction when the stopper is in the closed position (216) when the return is in a locked state.

6. The oral irrigator system of claim 4, further comprising a stand (264) arranged to receive the oral irrigator handle and arranged to engage with the stopper (208).

7. The oral irrigator system of claim 6, wherein the stand (264) further comprises a magnet (268) arranged to bias the second portion (240) of the stopper; or,
the stand further comprises a mechanical protrusion (272) arranged to engage with the second portion of the stopper.

8. An oral irrigator system (100) having an oral irrigator (104) with a handle (300), the handle comprising a housing (304), the housing having a cavity (306) arranged therein, the cavity comprising:
a fluid channel (308) wherein a fluid flow (312) moves in a first direction substantially parallel with a first axis (316) when the oral irrigator is in an on state;
a valve (320) arranged to inhibit and allow the fluid flow through the fluid channel when in a closed state and an open state, respectively;
a pressure plate (324) arranged to move in a second direction orthogonal to the first direction, or a third direction opposite the second direction, when pressure increases in the fluid channel due to the fluid flow;
a resilient device (332) arranged to compress in the second direction or the third direction;
a gated path component (336), having a body (340), the body comprising:
a first channel (344) arranged within the body and extending in the second direction or the third direction, the first channel having a first end (348) and a second end (352);
a second channel (356) arranged within the body extending in a direction offset from the first direction by a first angle (382), the second channel (356) having a third end (360) and a fourth end (364);
wherein the second end (352) of the first channel (344) and the third end (360) of the second channel (356) are integrally connected with each other.

9. The oral irrigator system of claim 8, wherein the handle (300) further comprises:
a slider (368) arranged to move from a first position (400) to a second position (404), wherein the first position and the second position correspond to the closed state and the open state of the valve (320), respectively;
a guide pin (372) arranged within the cavity (306) of the handle, the guide pin arranged to move within the first channel (344) and the second channel (356) of the gated path component (336);

a tab (376) fixedly secured to the slider, the tab comprising a third channel (380) extending in the second direction or the third direction and arranged to slidingly engage the guide pin;

wherein the fluid flow (312) within the fluid channel (308) creates a first force on the pressure plate in the second direction or the third direction transitioning the oral irrigator into an unlocked state.

10. The oral irrigator system of claim 9, wherein in the unlocked state, the slider (368) is arranged to move from the first position (400) to the second position (404), and the slider is arranged to move the guide pin (372) along the second channel (356) of the gated path component, wherein a transition of the slider from the first position to the second position corresponds to a transition of the valve (320) from the closed state to the open state.

11. The oral irrigator system of claim 9, wherein when the oral irrigator (104) is in an off state, the slider (368) is arranged to move from the second position (404) to the first position (400), and the slider (368) is arranged to move the guide pin (372) along the second channel (356) of the gated path component (336), wherein a transition of the slider (368) from the second position (404) to the first position (400) corresponds to a transition of the valve (320) from the open state to the closed state.

12. The oral irrigator system of claim 9, wherein in an off state, the guide pin (372) is further arranged to move within the first channel (344) of the gated path component (336) from the second end (352) to the first end (348), transitioning into a locked state.

\* \* \* \* \*